(12) United States Patent
Fujimoto et al.

(10) Patent No.: US 11,500,416 B1
(45) Date of Patent: Nov. 15, 2022

(54) INFORMATION PROCESSING APPARATUS

(71) Applicant: PANASONIC INTELLECTUAL PROPERTY MANAGEMENT CO., LTD., Osaka (JP)

(72) Inventors: Romu Fujimoto, Kanagawa (JP); Takeyuki Sasaki, Kanagawa (JP); Yasuji Wakiyama, Kanagawa (JP); Yasuyuki Tanaka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/575,270

(22) Filed: Jan. 13, 2022

(30) Foreign Application Priority Data

Jun. 30, 2021 (JP) .............................. JP2021-109280

(51) Int. Cl.
*G06F 3/041* (2006.01)
*G06F 1/16* (2006.01)
*G07F 7/08* (2006.01)

(52) U.S. Cl.
CPC .......... *G06F 1/1626* (2013.01); *G06F 1/1652* (2013.01); *G06F 1/1677* (2013.01); *G06F 3/0412* (2013.01); *G07F 7/0886* (2013.01)

(58) Field of Classification Search
CPC .... G06F 1/1626; G06F 1/1652; G06F 1/1677; G06F 3/0412; G07F 7/0886
See application file for complete search history.

(56) References Cited

FOREIGN PATENT DOCUMENTS

JP 2012-185543 9/2012
JP 2017050105 A * 3/2017 ............... E05G 1/02

* cited by examiner

*Primary Examiner* — Towfiq Elahi
(74) *Attorney, Agent, or Firm* — Greenblum & Bernstein, P.L.C.

(57) ABSTRACT

An information processing apparatus includes: a housing; a touch panel installed in the housing; an opening detection switch configured to detect opening of the touch panel from the housing; a first flexible substrate connected to the touch panel, bent at a bent portion, provided with an electronic component mounted thereon in the housing, and disposed along the touch panel; and a holder member installed in the housing between the touch panel and the first flexible substrate. The holder member includes a rib protruding toward the first flexible substrate. The first flexible substrate has an engagement hole through which the rib penetrates.

3 Claims, 12 Drawing Sheets

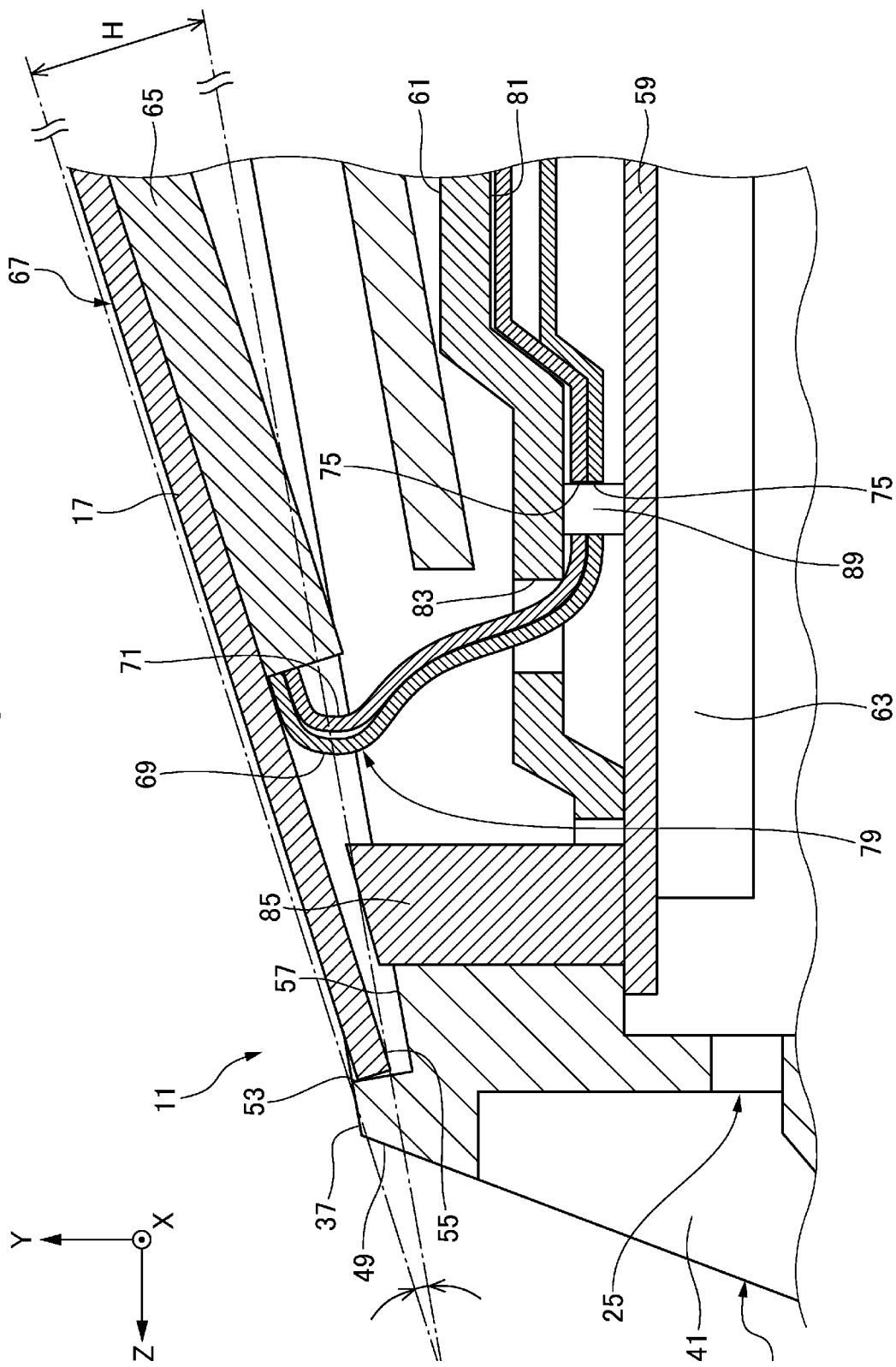

INFORMATION PROCESSING APPARATUS

CROSS-REFERENCE TO RELATED APPLICATIONS

This application is based on and claims the benefit of priority of Japanese Patent Application No. 2021-109280 filed on Jun. 30, 2021, the entire contents of which are incorporated herein by reference.

FIELD

The present disclosure relates to an information processing apparatus.

BACKGROUND

JP-A-2012-185543 discloses a portable payment terminal capable of executing all payment functions with any of a magnetic stripe card, a contact IC card, and a contactless IC card. The portable payment terminal includes a touch panel display.

SUMMARY

To the touch panel display, information requiring security, such as a personal identification number, may be input. In this case, it is conceivable that a malicious third party unseals the touch panel display and takes away an internal electronic component. Therefore, in order to prevent such malicious opening of the touch panel display, it is conceivable to install opening detection switches for detecting opening of the touch panel display at a plurality of locations in a portable payment terminal.

However, if the opening detection switches are installed at various locations in the portable payment terminal, it is necessary to ensure a large space for installation, which leads to difficulty of reduction of the size of the portable payment terminal.

The present disclosure has been made in view of the above-described circumstances, and an object thereof is to provide an information processing apparatus capable of reducing its size while preventing deterioration in security even in a case where opening of a touch panel is contrived.

In an aspect of the present disclosure, there is provided an information processing apparatus including: a housing; a touch panel installed in the housing; an opening detection switch configured to detect opening of the touch panel from the housing; a first flexible substrate connected to the touch panel, bent at a bent portion, provided with an electronic component mounted thereon in the housing, and disposed along the touch panel; and a holder member installed in the housing between the touch panel and the first flexible substrate, wherein the holder member includes a rib protruding toward the first flexible substrate, and wherein the first flexible substrate has an engagement hole through which the rib penetrates.

According to the present disclosure, it is possible to reduce the size of the entire apparatus while preventing deterioration in security even in a case where opening of a touch panel is contrived.

BRIEF DESCRIPTION OF DRAWINGS

FIG. 12 is an enlarged view of a main part of the touch panel in FIG. 11 that is opened.

DETAILED DESCRIPTION

Hereinafter, embodiments specifically disclosing an information processing apparatus according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The attached diagrams and the following description are provided for those skilled in the art to sufficiently understand the present disclosure, and are not intended to limit the matters described in the scope of the claims.

Figure 1:
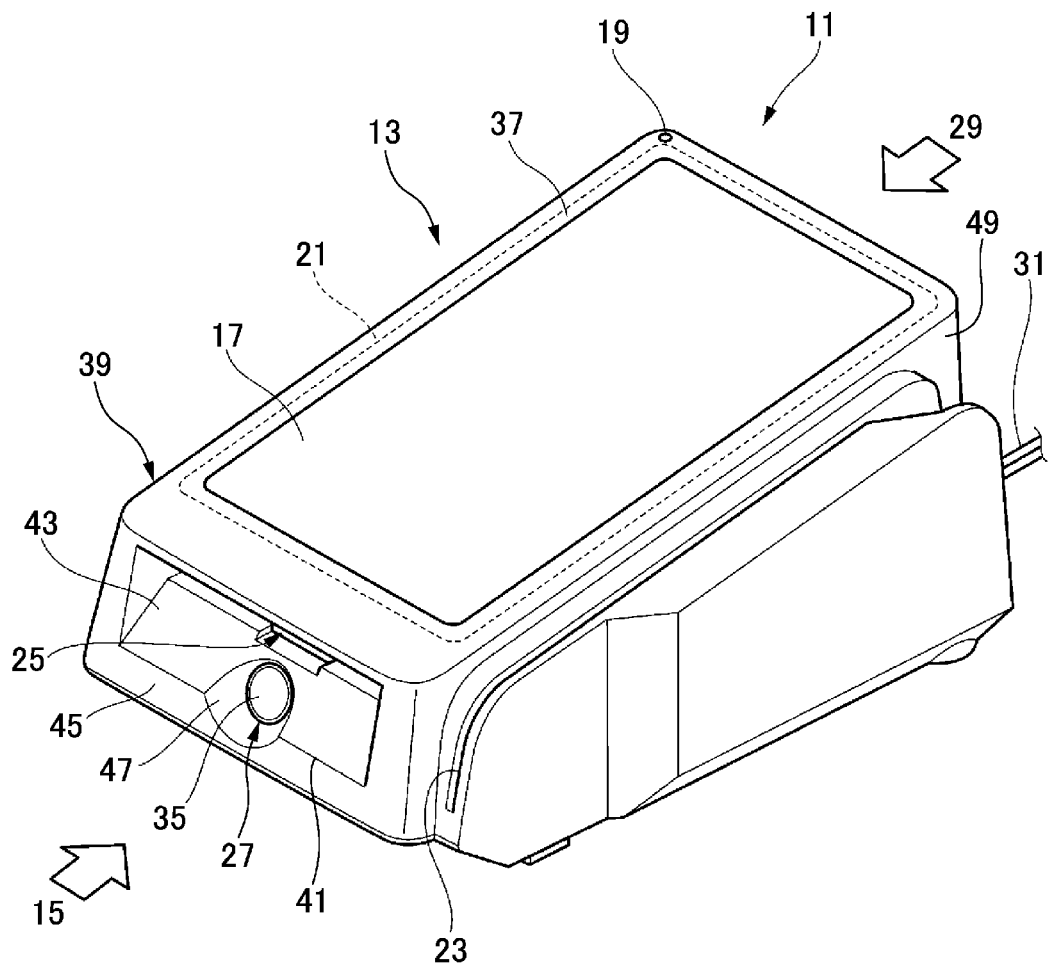
FIG. 1 is a front perspective view illustrating an example of an external appearance of an information processing apparatus according to a first embodiment.

FIG. 1 is a front perspective view illustrating an example of an external appearance of an information processing apparatus 11 according to a first embodiment. Each direction in the present embodiment follows a direction of an arrow attached to an X axis, a Y axis, and a Z axis illustrated in each drawing. Here, the X-axis direction is a direction parallel to a horizontal plane. The Y-axis direction is a direction perpendicular to the horizontal plane and is parallel to a vertical direction. The Z-axis direction is a direction parallel to the horizontal plane and perpendicular to the X-axis direction. In the present embodiment, the X-axis direction is also referred to as the left-right direction, the +X direction (X-axis positive direction) is also referred to as the rightward direction, and the −X direction (X-axis negative direction) is also referred to as the leftward direction. The Y-axis direction is also referred to as the up-down direction, the +Y direction (Y-axis positive direction) is also referred to as the upward direction, and the −Y direction (Y-axis negative direction) is also referred to as the downward direction. The Z-axis direction is also referred to as a front-back direction, the +Z direction (Z-axis positive direction) is also referred to as the frontward direction, and the −Z direction (Z-axis negative direction) is also referred to as backward direction. In each of the drawings, a circle surrounding a point at an intersection of the orthogonal axes indicates a direction from the back side of a paper surface to the front side of the paper surface, and a circle surrounding X at an intersection of the orthogonal axes indicates a direction from the front side of the paper surface to the back side of the paper surface.

An information processing apparatus 11 is, for example, a stationary apparatus, and is used by being placed on a horizontal plane (for example, a table). In FIG. 1, the lateral direction of a bottom of the information processing apparatus 11 is along the X-axis direction, and the longitudinal direction of the bottom of the information processing apparatus 11 is along the Z-axis direction. The information processing apparatus 11 is, for example, a payment processing apparatus.

The information processing apparatus 11 includes a body 13. The body 13 has a box shape. A user operates the information processing apparatus 11 from a front 15 of the information processing apparatus 11. The user may be a purchaser of a product or a customer in a store. The information processing apparatus 11 is connected to a store terminal (not illustrated) operated by a store clerk. The information processing apparatus 11 is capable of executing various types of payment processing in cooperation with the store terminal. The store terminal executes, for example, input of a product, input of an amount of money, and selection of a payment method via an input device of the store terminal.

The information processing apparatus 11 includes a touch panel 17, a light emitting diode (LED) 19, a near field communication (NFC) antenna 21, a first card slot 23, a second card slot 25, and a camera 27. The information processing apparatus 11 includes a cable 31 on a back 29. Examples of the cable 31 may include a power cable, a communication cable, a local area network (LAN) cable, and a universal serial bus (USB) cable.

The information processing apparatus 11 is a composite type apparatus capable of executing payment processing in accordance with a plurality of payment methods. The information processing apparatus 11 can be used, for example, in a state where the information processing apparatus 11 is placed on a placement surface of a counter (not illustrated) of a store. The information processing apparatus 11 may execute the payment processing in accordance with any one of the payment methods.

Examples of a plurality of payment methods include credit card payment, electronic money payment, code (such as a QR code (registered trademark)) payment, and cash settlement. Examples of the credit card payment includes magnetic card payment, contact IC card payment, and contactless IC card payment. As for the electronic money, a plurality of types of electronic money may exist. The electronic money payment and the contactless IC card payment are also collectively referred to as contactless payment since the electronic money payment and the contactless IC card payment are performed using contactless communication (for example, near field communication (NFC)).

The plurality of payment methods are executed using a plurality of corresponding payment interfaces. Examples of the plurality of payment interfaces include a credit card, an electronic money card, a code, and cash. Examples of the credit card include a magnetic card, a contact IC card, and a contactless IC credit card.

The magnetic card is used for payment by being inserted into the first card slot 23. The contact IC card is used for payment by being inserted into the second card slot 25. The contactless IC credit card and the electronic money card are used for payment by approaching the NFC antenna 21. The contactless IC credit card and the electronic money card are also collectively referred to as a "contactless IC card".

The camera 27 includes a camera module 33 (see FIG. 2) and a lens 35. In the information processing apparatus 11, the NFC antenna 21 and the touch panel 17 may have the same height from the placement surface. That is, in the information processing apparatus 11, the NFC antenna 21 may be disposed around the touch panel 17 on the same plane. The surface on which the touch panel 17 is disposed is also referred to as a panel arrangement surface 37. The panel arrangement surface 37 may be, for example, a top of the body 13. In the information processing apparatus 11 of the present embodiment, a side on which the panel arrangement surface 37 is formed is referred to as an upper side, and the opposite side thereof is referred to as a lower side.

The first card slot 23 is disposed along a side on a right side or a left side as viewed from the front 15, for example, on the right side in FIG. 1. In this case, the user can easily select any payment method from the plurality of payment methods corresponding to the plurality of devices arranged in front of the eyes.

In the information processing apparatus 11, a height of the back 29 is larger than that of the front 15. That is, the panel arrangement surface 37 of the body 13 of the information processing apparatus 11 is gradually lowered toward the user side. That is, in a case where the user faces the second card slot 25, the orientation of the panel arrangement surface 37 of the information processing apparatus 11 is directed obliquely upward toward the user.

The LED 19 is disposed on the panel arrangement surface 37 of the body 13 of the information processing apparatus 11. The arrangement position of the LED 19 is not limited to this example, and may be any position that can be visually recognized by the user. The LED 19 can be used, for example, for displaying a power-supply state of a power source.

The touch panel 17 is used for payment performed by the user. The touch panel 17 may be provided over the entire surface of the panel arrangement surface 37, or may be provided on a part of the panel arrangement surface 37. The touch panel 17 has an input function for receiving various operations performed by the user and inputting various pieces of data and information. The touch panel 17 has a display function of displaying various pieces of data, information, images, and the like. Therefore, the touch panel 17 can provide visual information to the user. On the touch panel 17, an input detection region where an input is detected and a display region where various types of displays are performed may be the same region, or at least part of the input detection region and the display region may be different regions. The touch panel 17 is illustrated as an input unit for the user. However, the information processing apparatus 11 may include other input units (for example, physical keys and buttons).

The information processing apparatus 11 includes, on the front 15, an open space 41 in which a housing 39 of the body 13 is absent. An opening of the open space 41 is the widest on the front side, and becomes narrower toward the back 29. That is, the diameter of the open space 41 increases from the back side toward the front side. The second card slot 25 and the lens 35 of the camera 27 are disposed in the open space 41. For example, the second card slot 25 is located at a part of the open space 41 on the backmost side.

An inclined lower surface 43 is disposed at a lower portion of a peripheral end of the open space 41. The inclined lower surface 43 forms a tapered surface that gradually approaches the placement surface from the back side toward the front side. The inclined lower surface 43 is formed in, for example, a substantially planar shape. A lower frame surface 45 and the inclined lower surface 43 are connected to each other. The lower frame surface 45 is at a lower portion around the open space 41 on the front surface side of the body 13 of the information processing apparatus 11. A part of a connecting part between the lower frame surface 45 of the body 13 and the inclined lower surface 43 of the open space 41 has a recessed shape and forms a recessed portion 47. The recessed portion 47 is a part of the open space 41.

A shape of a contour of the recessed portion 47 is, for example, a semi-arc shape or a semi-elliptical arc shape. The lens 35 of the camera 27 is exposed in the recessed portion 47. A front side of the lens 35 is not covered with the housing 39 of the body 13. Therefore, the camera 27 can introduce light from the outside of the information processing apparatus 11 through the recessed portion 47. The lens 35 is disposed in the recessed portion 47, so that a finger, dust, or the like of the user at the time of payment is not likely to reach the lens 35, and the lens 35 is protected from damage or adhesion of dirt.

Figure 2:
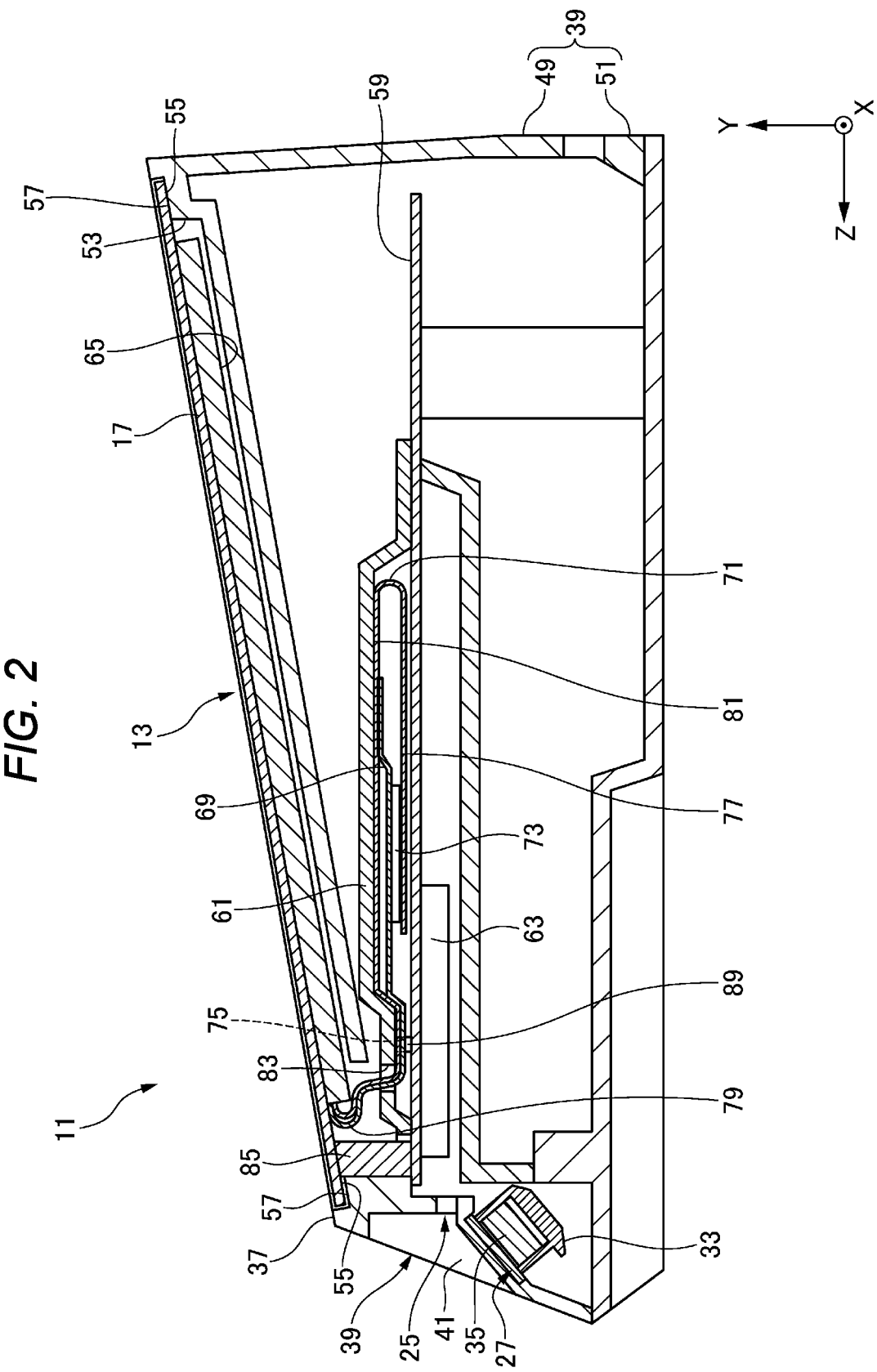
FIG. 2 is a side sectional view of the information processing apparatus illustrated in FIG. 1.

FIG. 2 is a side sectional view of the information processing apparatus 11 illustrated in FIG. 1.

The housing 39 of the body 13 includes an upper case 49 on which the panel arrangement surface 37 is formed, and a lower case 51 attached to a lower side of the upper case 49. A panel attachment open space 53 is formed in the panel arrangement surface 37 of the upper case 49. A stepped portion 57 on which an edge 55 of the touch panel 17 is placed is formed on an inner periphery of the panel attachment open space 53. That is, the touch panel 17 is installed on the panel arrangement surface 37 of the upper case 49 by placing the edge 55 on the stepped portion 57.

A substrate 59 having a rectangular shape being long in the front-back direction is fixed to a substantially central portion of the upper case 49 in the up-down direction. A holder member 61 is fixed to the upper case 49 between the touch panel 17 and the substrate 59 in a manner of being parallel to the substrate 59. A second card reader 63 is fixed to a surface of the substrate 59 opposite to the holder member 61. The second card reader 63 reads a contact IC card inserted from the second card slot 25.

The holder member 61 is formed using, for example, laser direct structuring (LDS) that forms a pattern by irradiating a resin with a laser. The holder member 61 is, for example, a resin member. The holder member 61 may be formed by other methods, for example, a method in which the holder member 61 is formed in a substantially rectangular shape by sheet metal processing of a metal plate.

Figure 3:
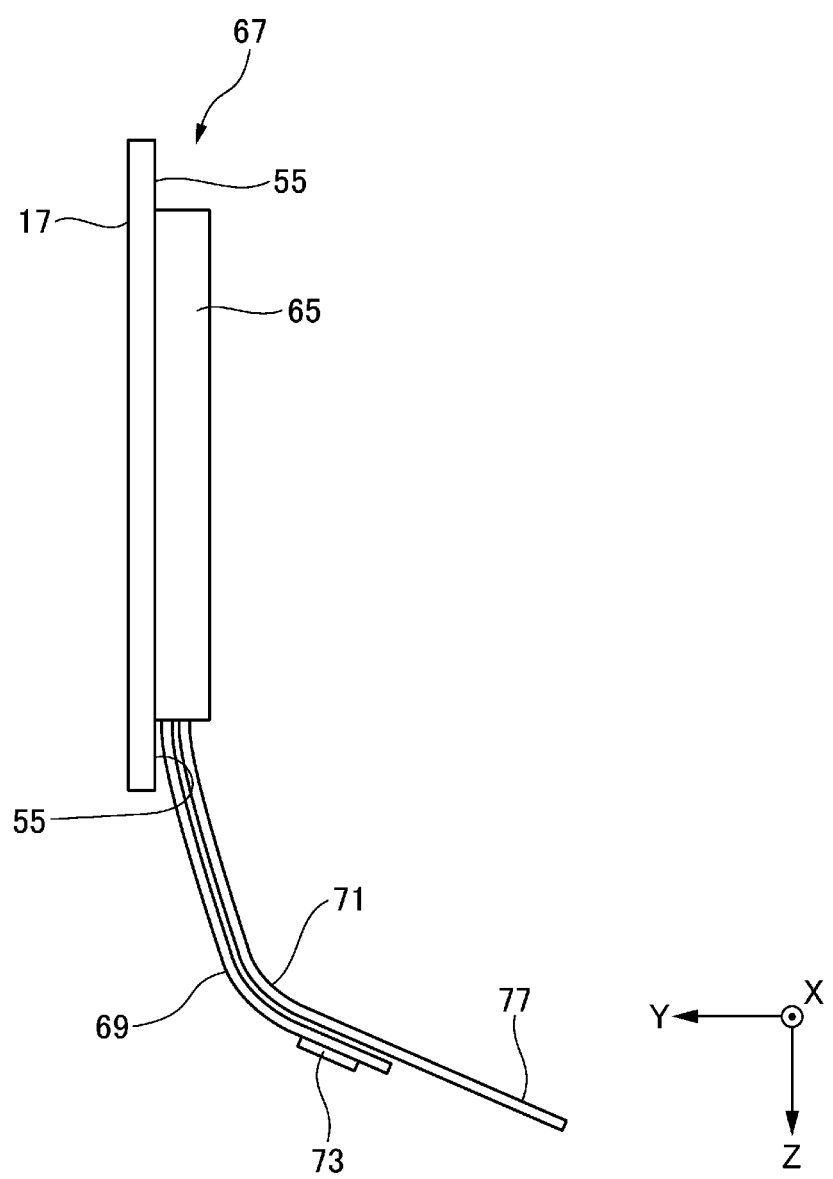
FIG. 3 is a side view of an input display module formed by stacking a touch panel and a liquid crystal display.

FIG. 3 is a side view of the input display module 67 formed by stacking the touch panel 17 and the liquid crystal display 65.

In the information processing apparatus 11, for example, the liquid crystal display 65, which is a flat display device, is disposed on a backside of the touch panel 17 on the holder member 61 side. The touch panel 17 and the liquid crystal display 65 are integrally fixed. As the flat display device, an organic (Electro Luminescence) panel may be used instead of the liquid crystal display 65. The touch panel 17 and the liquid crystal display 65 are formed in, for example, a quadrangular shape. The quadrangular shape is, for example, a rectangular shape that is long in the front-back direction of the information processing apparatus 11. The touch panel 17 and the liquid crystal display 65 that are integrally fixed constitute the input display module 67. In the input display module 67, the touch panel 17 is larger than the liquid crystal display 65, and the edge 55 of the touch panel 17 protrudes outward from the contour of the liquid crystal display 65 when viewed from the housing 39 side (right side in FIG. 3).

A first flexible substrate 69 that outputs touch operation information is led out from a backside on one (front) side of a pair of parallel short sides of the touch panel 17. The touch operation information may be information input by an operation on the touch panel 17. Similarly, a second flexible substrate 71 that receives display information is also led out from a front short side of the pair of parallel short sides of the liquid crystal display 65. The display information may be information displayed on the liquid crystal display 65. The first flexible substrate 69 and the second flexible substrate 71 are led out in the same order as a stacking order of the touch panel 17 and the liquid crystal display 65. The first flexible substrate 69 is led out to an upper layer side, and the second flexible substrate 71 is led out to a lower layer side when viewed from a front side of the information processing apparatus 11.

As will be described later, the first flexible substrate 69 and the second flexible substrate 71 are bent by about 180° by bent portions 79 at a portion immediately after being led out. Therefore, the stacking order of the first flexible substrate 69 and the second flexible substrate 71 after being bent are reversed as viewed from the front side of the information processing apparatus 11, and the second flexible substrate 71 becomes the upper layer side and the first flexible substrate 69 becomes the lower layer side.

The first flexible substrate 69 and the second flexible substrate 71 are, for example, a flat circuit body obtained by forming a conductor pattern on an insulating sheet member. For this type of flat circuit body, it is possible to use a flexible flat cable (FFC) formed in a flexible band-shaped cable by covering a conductor made of a plurality of band-shaped thin plates with an insulating sheet member, a flexible printed circuit (FPC) obtained by printing a conductor pattern on a flexible insulating substrate, or the like.

An electronic component 73 (for example, various integrated circuits (ICs)) is mounted on the first flexible substrate 69 connected to the touch panel 17. The electronic component 73 stores information (for example, a personal identification number used for payment) input by the touch panel 17. The electronic component 73 is disposed, for example, on a distal end side (a side opposite to the touch panel 17 to which first flexible substrate 69 is connected) of the first flexible substrate 69. The electronic component 73 is mounted on, for example, a surface of the first flexible substrate 69 on a side opposite to the second flexible substrate 71. A pad (not illustrated) to be electrically connected to a predetermined conductor is provided on a surface of the insulating member on a mounting surface of the first flexible substrate 69. The electronic component 73 is directly bonded to the pad, for example, with a surface electrode facing the pad. The first flexible substrate 69 and the second flexible substrate 71 may be connected to the substrate 59 by a connector (not illustrated).

The holder member 61 surrounds a part of the first flexible substrate 69 and a part of the second flexible substrate 71 between the holder member 61 and the substrate 59. The holder member 61 also surrounds, between the holder member 61 and the substrate 59, the electronic component 73 mounted on the first flexible substrate 69. Accordingly, the holder member 61 protects a part of the first flexible substrate 69, a part of the second flexible substrate 71, and the electronic component 73 disposed in a space between the holder member 61 and the substrate 59.

Figure 4:
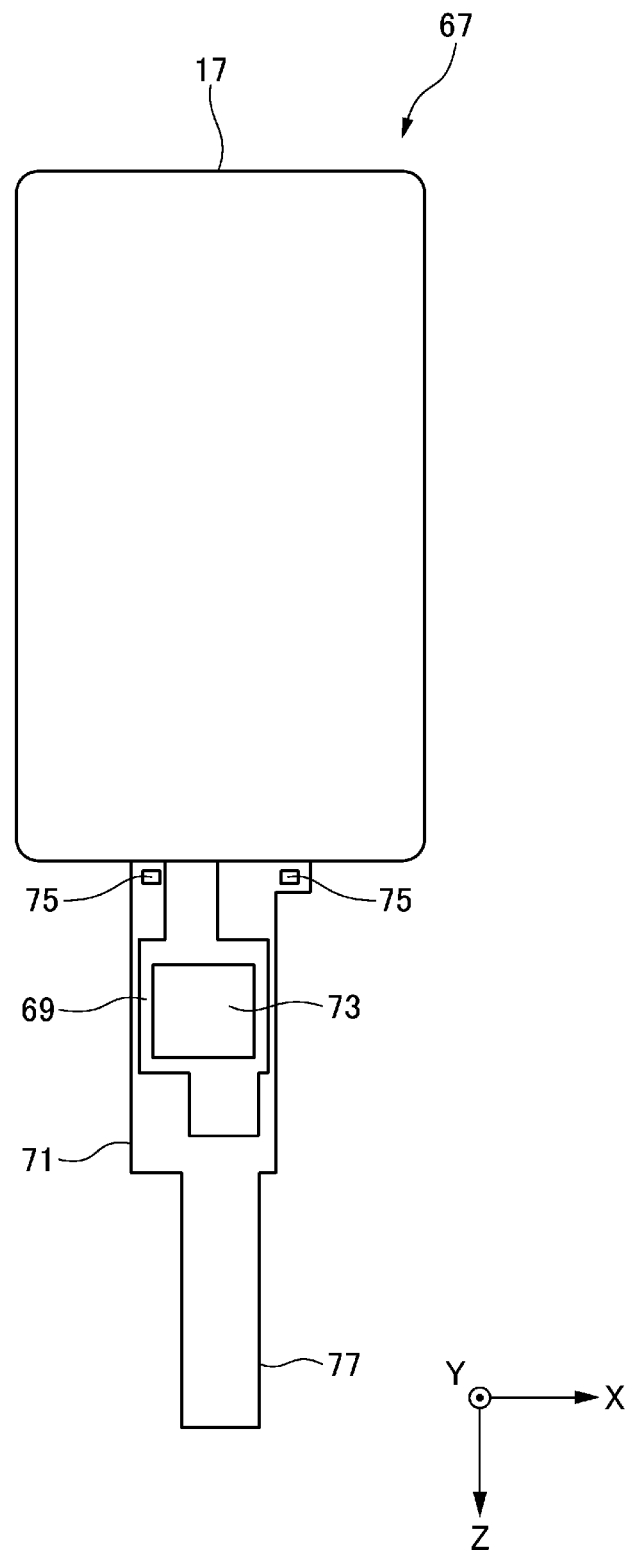
FIG. 4 is a plan view of the input display module with the touch panel facing upward.

FIG. 4 is a plan view of the input display module 67 with the touch panel 17 facing upward.

A pair of engagement holes 75 are formed in the second flexible substrate 71 in a manner of being spaced apart from each other in the left-right width direction of the substrate. The first flexible substrate 69 is stacked on the upper side of the second flexible substrate 71 at a position where the engagement holes 75 are not blocked. The second flexible substrate 71 is provided with an extending portion 77 that extends from an end portion on a side opposite to the liquid crystal display 65 with a small width.

Figure 5:
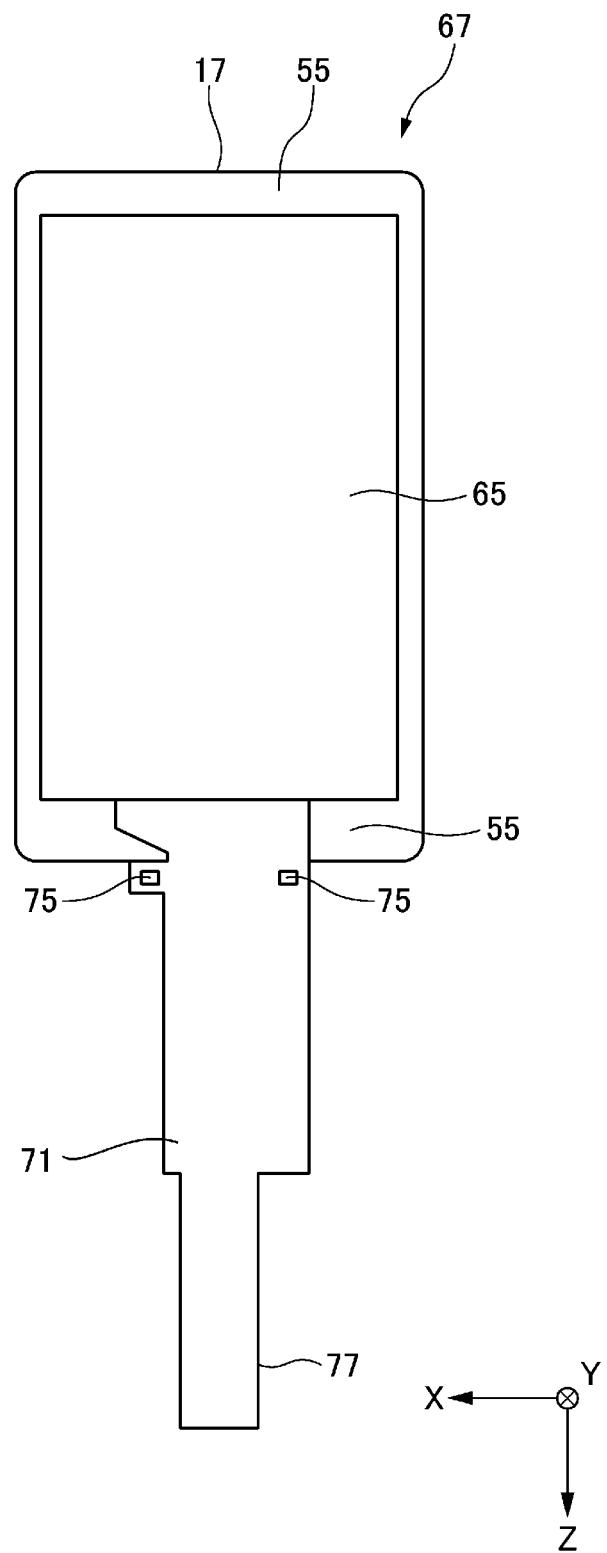
FIG. 5 is a back view of the input display module with the liquid crystal display facing upward.

FIG. 5 is a back view of the input display module 67 with the liquid crystal display 65 facing upward.

In the back view of the input display module 67 as viewed from the side opposite to the touch panel 17, the first flexible substrate 69 is hidden behind the second flexible substrate 71 and is not visually recognized. Also in this case, the pair of engagement holes 75 are disposed outside the contour of the touch panel 17. The first flexible substrate 69 and the second flexible substrate 71 are folded back to form bent portions 79 between the respective lead-out positions from the touch panel 17 and the liquid crystal display 65 and the engagement holes 75.

The first flexible substrate 69 and the second flexible substrate 71 may be fixed to each other by an adhesive, a double-sided adhesive tape, or the like in a stacked state. In this case, the engagement holes 75 can penetrate either the first flexible substrate 69 or the second flexible substrate 71, or both the first flexible substrate 69 and the second flexible substrate 71. That is, the pair of engagement holes 75 may be formed in both the first flexible substrate 69 and the second flexible substrate 71, or may be formed in one of the first flexible substrate 69 and the second flexible substrate 71. In particular, as will be described later, in the case of a structure in which the first flexible substrate 69 is hidden behind the second flexible substrate 71 and cannot be seen from an opening side of the touch panel 17, the pair of engagement holes 75 may be provided only in the second flexible substrate 71.

Figure 6:
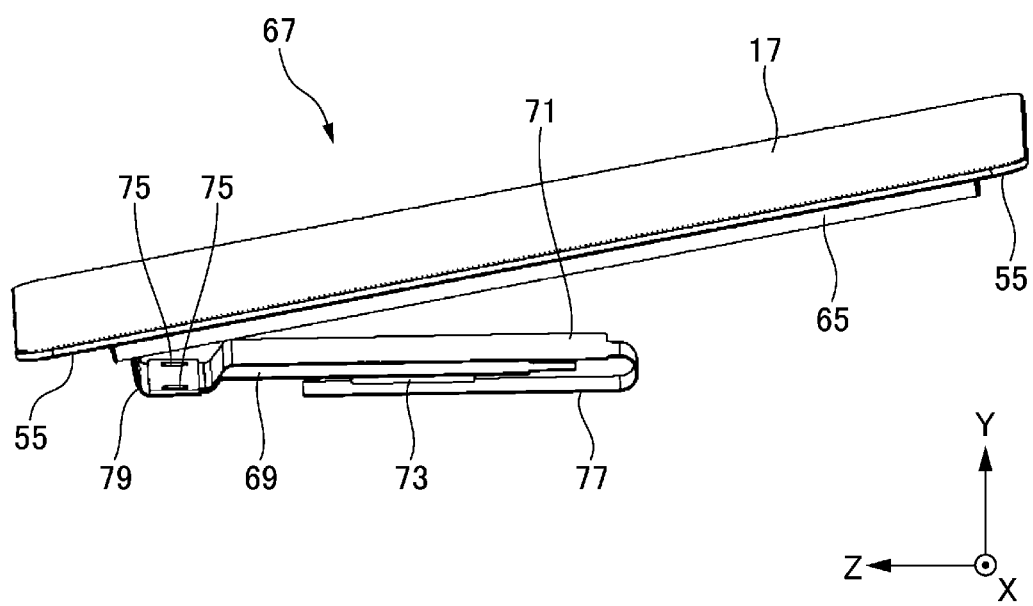
FIG. 6 is a side view of the input display module in which a first flexible substrate and a second flexible substrate are bent.

FIG. 6 is a side view of the input display module 67 in which the first flexible substrate 69 and the second flexible substrate 71 are bent. FIG. 6 illustrates an example in which the engagement holes 75 are formed in both the first flexible substrate 69 and the second flexible substrate 71.

The first flexible substrate 69 and the second flexible substrate 71 are folded back by approximately 180° by the bent portions 79 between respective lead-out positions from the touch panel 17 and the liquid crystal display 65 and the engagement holes 75 so as to be disposed along the touch panel 17 and the liquid crystal display 65. The extending portion 77 of the second flexible substrate 71 is bent so as to cover the electronic component 73 mounted on the first flexible substrate 69. The part of the first flexible substrate 69 on which the electronic component 73 is mounted and the electronic component 73 are interposed between the second flexible substrate 71 and the extending portion 77 thereof.

Figure 7:
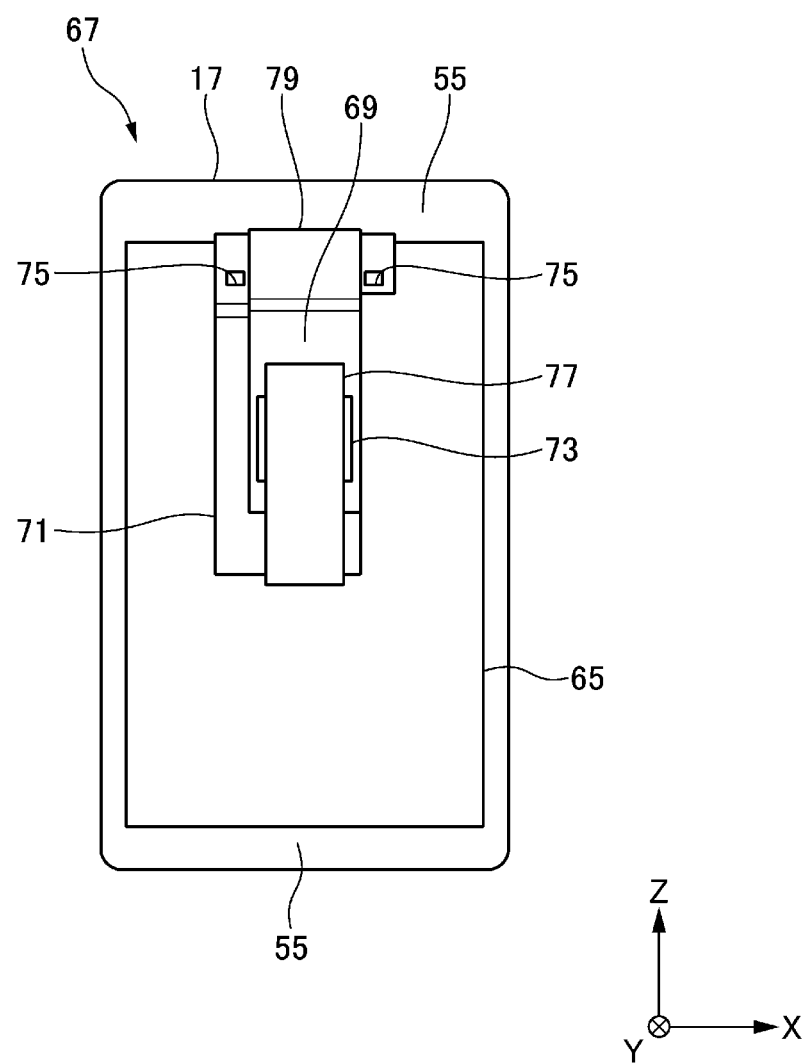
FIG. 7 is a back view of the input display module in which the first flexible substrate and the second flexible substrate are bent and connected with the liquid crystal display facing upward.

FIG. 7 is a back view of the input display module 67 in which the first flexible substrate 69 and the second flexible substrate 71 are bent and connected with the liquid crystal display 65 facing upward. FIG. 7 illustrates an example in which the engagement holes 75 are formed in the second flexible substrate 71.

In the first flexible substrate 69 and the second flexible substrate 71, the bent portions 79 are disposed at a substantially central part of a front short side of the liquid crystal display 65. The bent first flexible substrate 69 and second flexible substrate 71 are disposed in a region from the front short side of the liquid crystal display 65 from which the second flexible substrate 71 is led out to substantially half of a long side.

Figure 8:
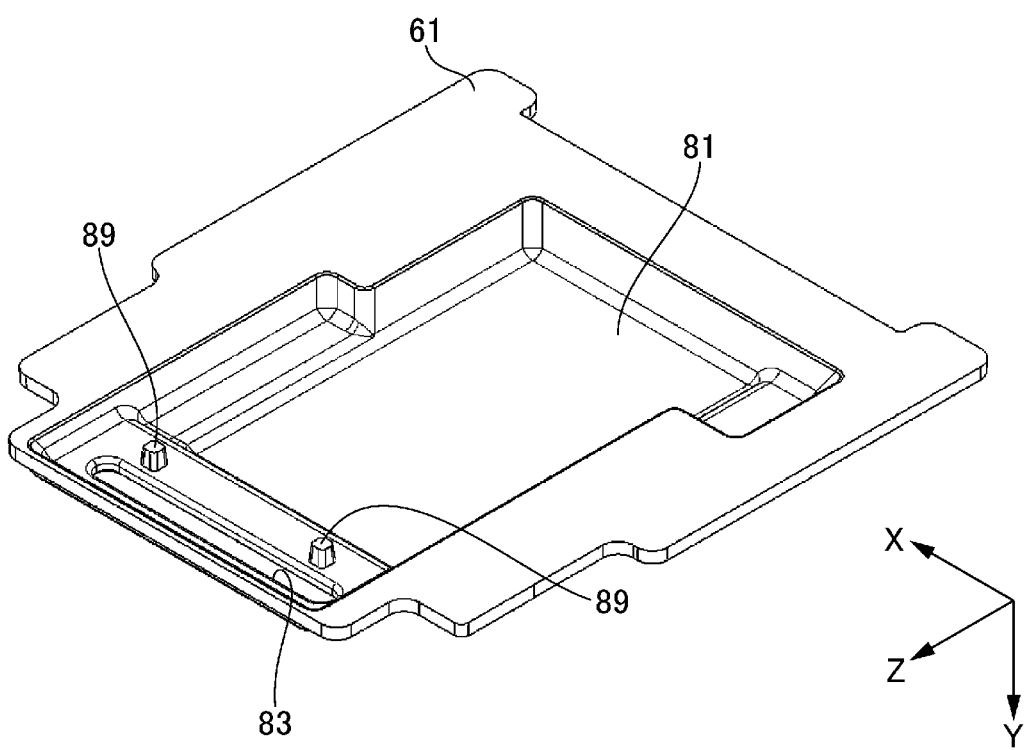
FIG. 8 is a perspective view of a holder member when a surface opposite to a surface facing the touch panel is viewed from above.

FIG. 8 is a perspective view of the holder member 61 as viewed with a surface opposite to the surface facing the touch panel 17 facing upward.

The holder member 61 is installed in the housing 39 between the touch panel 17 and the first flexible substrate 69 (see FIG. 2). The holder member 61 is provided with an accommodation recess 81 recessed toward the touch panel 17 at a substantially central portion thereof. The accommodation recess 81 can accommodate the first flexible substrate 69 and the second flexible substrate 71. The holder member 61 has a slit-shaped through hole 83 that is long along a front short side. The first flexible substrate 69 and the second flexible substrate 71, which are disposed on the inner side of the housing 39 relative to the bent portion 79, pass through the through hole 83.

A pair of ribs 89 spaced apart from each other in the longitudinal direction (X direction) of the through hole 83 protrude from the holder member 61 on a back side (on the negative side in the Z direction) of the through hole 83. A protruding distal end of each of the ribs 89 contacts the substrate 59. When the holder member 61, the first flexible substrate 69, and the second flexible substrate 71 are assembled in the housing 39, the pair of ribs 89 protrude from the holder member 61 toward the first flexible substrate 69 and the second flexible substrate 71.

Figure 9:
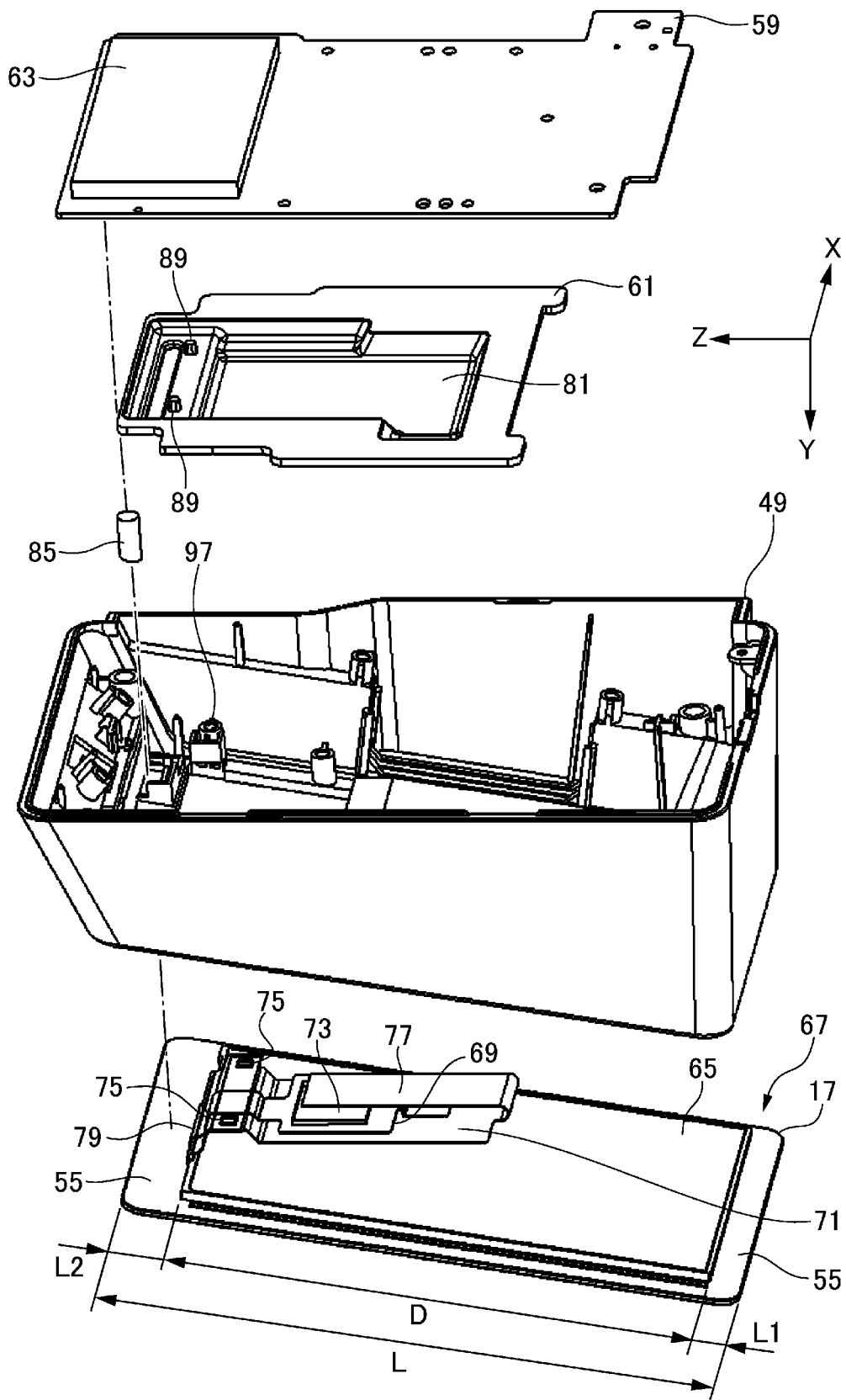
FIG. 9 is an exploded perspective view of a part of a body as viewed from below.

FIG. 9 is an exploded perspective view of a part of the body 13 as viewed from below.

The input display module 67 is attached by fitting the edges 55 of the touch panel 17 into the panel attachment open space 53 of the upper case 49. The first flexible substrate 69 and the second flexible substrate 71 connected to the input display module 67 are folded back at the bent portions 79. For example, a fixing screw (not illustrated) inserted through the holder member 61 is screwed into a fixing column 97, and thereby, the holder member 61 is fixed to the upper case 49. At this time, the first flexible substrate 69 and the second flexible substrate 71 pass through the through hole 83 of the holder member 61 from an end. The first flexible substrate 69 and the second flexible substrate 71 that have passed through the through hole 83, and the electronic components 73 mounted on the first flexible substrate 69 are disposed in the accommodation recess 81 of the holder member 61.

At this time, in the first flexible substrate 69 and the second flexible substrate 71 passing through the through hole 83, the rib 89 of the holder member 61 is inserted into the engagement hole 75. The holder member 61 in which the first flexible substrate 69, the second flexible substrate 71, and the electronic component 73 have been accommodated in the accommodation recess 81 is covered with the substrate 59 from below. Fixing screws (not illustrated) penetrating the substrate 59 are fastened to the upper case 49, and thereby, the substrate 59 covering the holder member 61 is fixed to the upper case 49 with the holder member 61 interposed therebetween.

At this time, an opening detection switch 85 is interposed between the front edge 55 of the touch panel 17 and the substrate 59. That is, in the information processing apparatus 11, both the opening detection switch 85 and the bent portion 79 are disposed between one side (for example, the front edge 55) of the touch panel 17 and the housing 39.

When the substrate 59 is fixed to the upper case 49, the substrate 59 and the touch panel 17 are electrically connected to each other to reach a conductive state via the opening detection switch 85. In this case, the opening detection switch 85 detects that the touch panel 17 is not opened. On the other hand, when the substrate 59 is disengaged from the upper case 49, the substrate 59 and the touch panel 17 are not electrically connected to each other via the opening detection switch 85, and are brought into a non-conductive state. In this case, the opening detection switch 85 detects that the touch panel 17 has been opened. The information processing apparatus 11 operates to prevent leakage of information (for example, clearing input information remaining in the electronic component 73) by detecting an open/close signal (a signal indicating the presence or absence of opening) of the opening detection switch 85.

In addition, for example, by fixing the substrate 59 to the upper case 49, the interval between the substrate 59 and the touch panel 17 is reduced to a predetermined distance. Accordingly, a key top is pushed against a biasing force of a biasing unit, and the contact point is opened or closed, so that it may be detected that the touch panel 17 is not opened. On the other hand, when the touch panel 17 is disengaged, the interval between the substrate 59 and the touch panel 17 increases to a predetermined distance (the touch panel 17 is opened). In this case, the contact point is closed or opened by an elastic restoring force of the biasing unit, so that it may be detected that the touch panel 17 is opened. As still another method, for example, the circuit may be opened since a linear or foil-like conductor is broken due to the opening of the touch panel 17. The detection method is not particularly limited as long as the opening detection switch 85 has an unauthorized opening detection function of detecting the opening of the touch panel 17.

Figure 10:
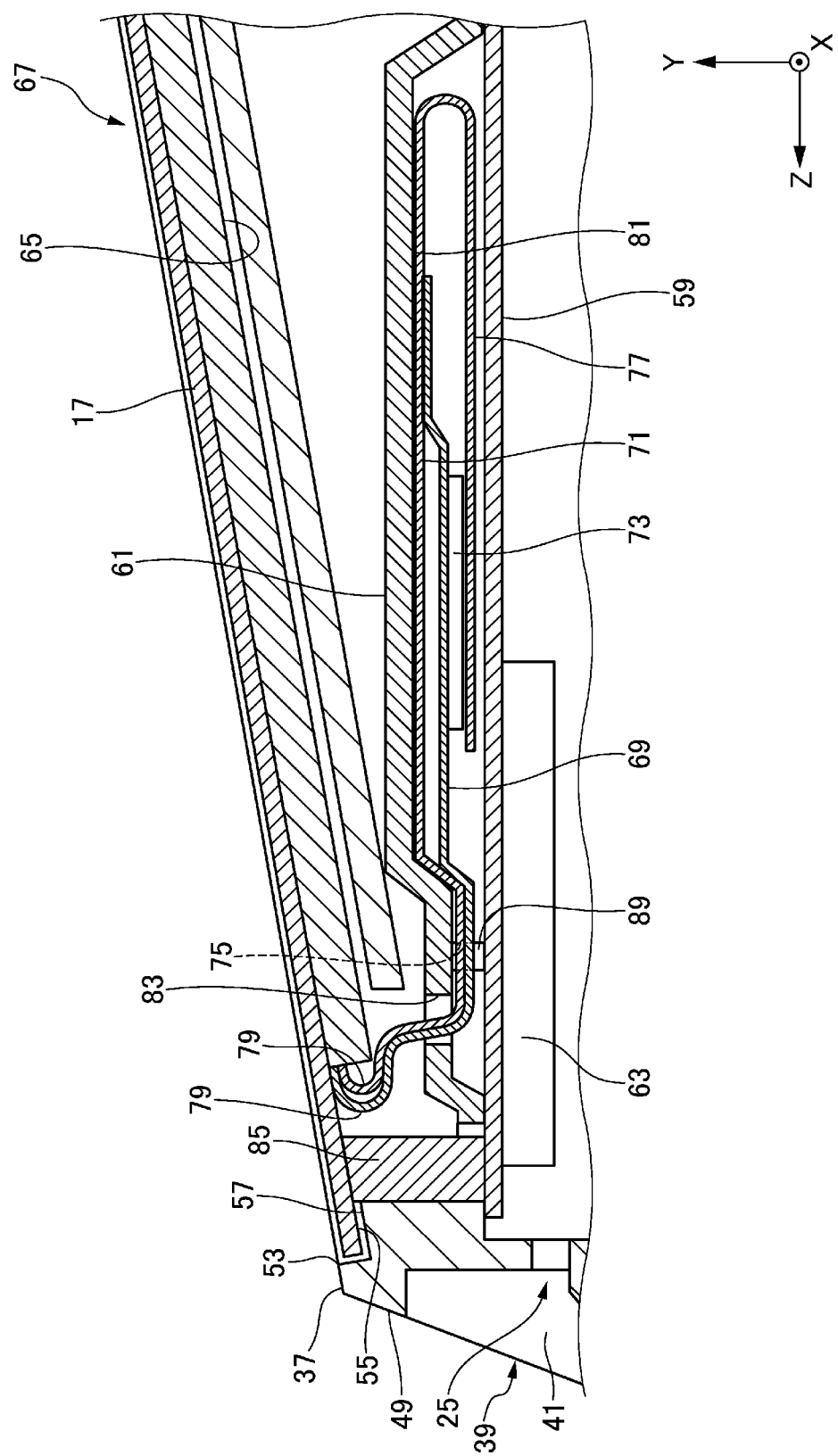
FIG. 10 is a side sectional view of a vicinity of the input display module in the information processing apparatus.

FIG. 10 is a side sectional view of a vicinity of the input display module 67 in the information processing apparatus 11.

In a state where the input display module 67 is attached to the panel attachment open space 53, the engagement holes 75 provided directly behind the bent portion 79 are engaged with the ribs 89 by being penetrated by the ribs 89. As for the first flexible substrate 69 and the second flexible substrate 71, the distance between the bent portion 79 and the rib 89 is set to a minimum extra length required during the assembly.

In the information processing apparatus 11, when the back short side is opened with the front short side (edge 55) of the touch panel 17 placed on the stepped portion 57 as a fulcrum, the first flexible substrate 69 and the second flexible substrate 71 extend between the input display module 67 and the ribs 89, and the back short side is restricted from being further opened. That is, an angle and a length (height) at which the touch panel 17 can be opened relative to the housing 39 are restricted. On the other hand, in the information processing apparatus 11, when the front short side (edge 55) of the touch panel 17 placed on the stepped portion 57 is opened in a direction away from the stepped portion 57, the opening detection switch 85 detects the opening.

Next, functions of the above configurations will be described.

The information processing apparatus 11 according to the present embodiment includes the housing 39, the touch panel 17 installed in the housing 39, the opening detection switch 85 configured to detect opening of the touch panel 17 from the housing 39, the first flexible substrate 69, and the holder member 61 installed in the housing between the touch panel 17 and the first flexible substrate 69. The first flexible substrate 69 is connected to the touch panel 17 and is bent at the bent portion 79. The first flexible substrate 69 is provided with the electronic component 73 mounted thereon in the housing 39 and is disposed along the touch panel 17. The holder member 61 includes ribs 89 protruding toward the first flexible substrate 69. The first flexible substrate 69 has engagement holes 75 through which the ribs 89 penetrate.

In the information processing apparatus 11, the touch panel 17 is installed on the panel arrangement surface 37 of the housing 39. The panel attachment open space 53 in which the touch panel 17 is placed is formed in the panel arrangement surface 37 of the housing 39. A stepped portion 57 on which an edge 55 of the touch panel 17 is placed is formed on an inner periphery of the panel attachment open space 53. That is, the touch panel 17 is attached to the panel arrangement surface 37 by placing the edges 55 on the stepped portion 57.

Figure 11:
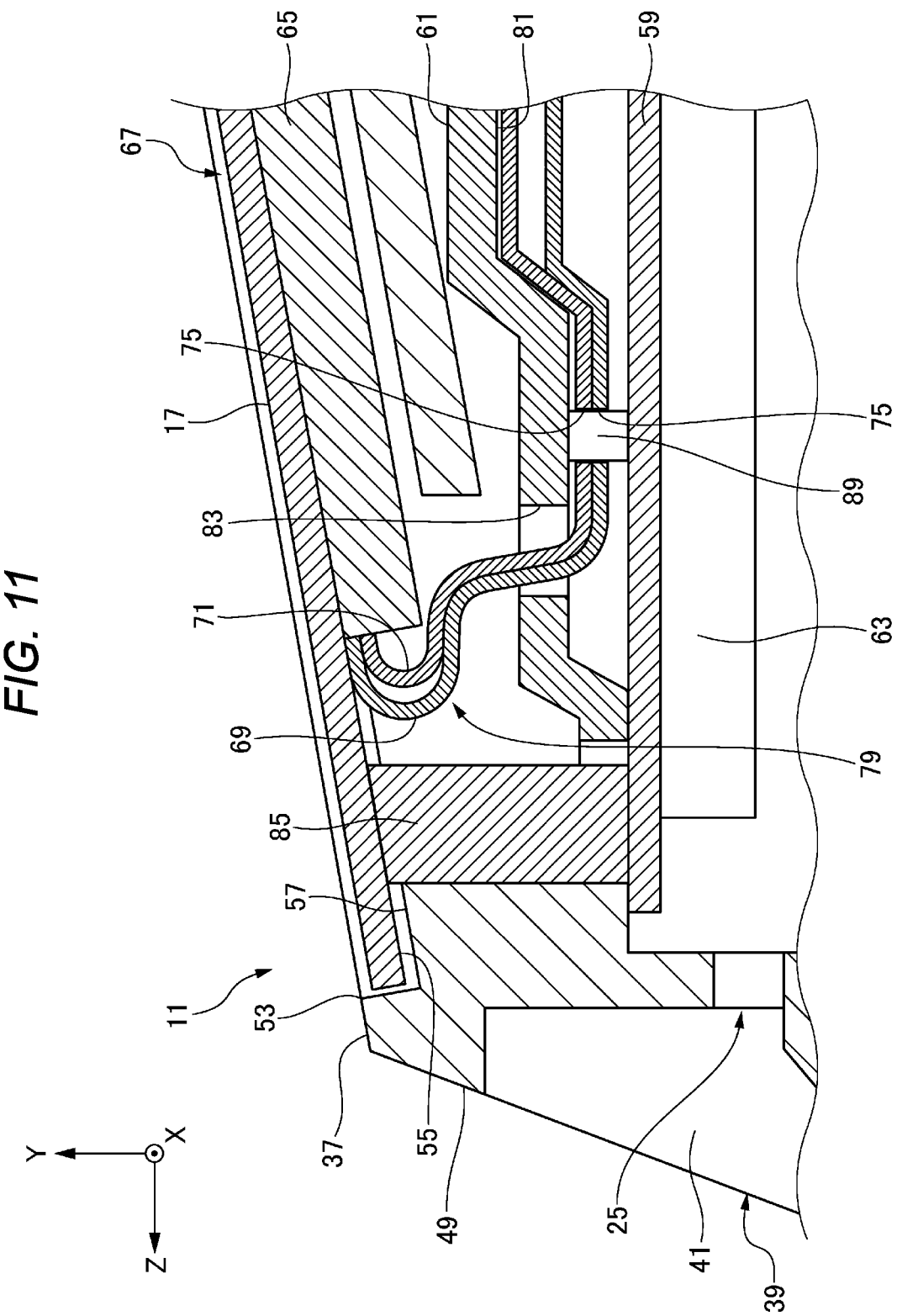
FIG. 11 is an enlarged view of a main part of FIG. 10.

FIG. 11 is an enlarged view of a main part in FIG. 10. FIG. 11 illustrates a state where the touch panel 17 is not opened.

The edge 55 of the touch panel 17 placed on the stepped portion 57 is brought into contact with the opening detection switch 85 (tamper switch) on a center side of the panel relative to the stepped portion 57. The opening detection switch 85 is configured to detect opening of the touch panel 17 from the housing 39 when the touch panel 17 floats (is peeled off) from the stepped portion 57.

The touch panel 17 is formed in a rectangular shape in a plan view. The first flexible substrate 69 that outputs touch operation information is led out from the front short side of the pair of parallel short sides of the touch panel 17. The first flexible substrate 69 is led out from the center side of the panel relative to the edge 55 of the touch panel 17 placed on the stepped portion 57, and does not interfere with the stepped portion 57. The first flexible substrate 69 is disposed along a backside of the touch panel 17 such that the portion of the first flexible substrate 69 closest to the panel lead-out portion is bent by approximately 180° at the bent portion 79. The electronic component 73 that receives the touch operation information is mounted on, for example, a surface of the first flexible substrate 69. The surface is on a side opposite to a surface facing the backside of the touch panel 17.

Here, the arrangement of the first flexible substrate 69 along the touch panel 17 is not limited to the arrangement in which the first flexible substrate 69 and the touch panel 17 are parallel to each other, and includes the arrangement in which the first flexible substrate 69 and the touch panel 17 are arranged at an angle close to parallel. In FIG. 11, the first flexible substrate 69 is disposed mainly parallel to the substrate 59, but it can be said that the first flexible substrate 69 is disposed along the touch panel 17.

The holder member 61 fixed to the housing 39 with a predetermined strength is disposed between the touch panel 17 and the first flexible substrate 69. The holder member 61 is disposed between the touch panel 17 and the first flexible substrate 69 that is bent at the bent portion 79 and disposed along the touch panel 17. The holder member 61 includes a pair of ribs 89 protruding toward the first flexible substrate 69 on a surface facing the first flexible substrate 69. The ribs 89 are disposed near the bent portion 79 between the bent portion 79 of the first flexible substrate 69 and the electronic component 73. The first flexible substrate 69 includes engagement holes 75 through which the ribs 89 penetrate. That is, in the first flexible substrate 69, the rib 89 protruding from the holder member 61 is inserted into the engagement hole 75 at a position immediately after the first flexible substrate 69 is folded back at the bent portion 79. Therefore, when the touch panel 17 is to be peeled off from the panel arrangement surface 37 by a malicious third party, the engagement holes 75 of the first flexible substrate 69 connected to the short side are locked to the ribs 89 of the holder member 61. Therefore, the pull-out force is supported by the holder member 61 via the first flexible substrate 69.

In the information processing apparatus 11, information input from the touch panel 17 (for example, an analog signal related to the input) is likely to be attacked. This is because the information received by the touch panel 17 may include highly confidential information such as a personal identification number. In the information processing apparatus 11, the engagement holes 75 are hooked on the ribs 89 so that the first flexible substrate 69 and the electronic component 73 are not taken out when the touch panel 17 and the liquid crystal display 65 are lifted. Therefore, according to the information processing apparatus 11, it is possible to prevent an attack at a stage before the electronic component 73 is taken out.

As a result, in the information processing apparatus 11, the electronic component 73 is less likely to be taken away, and security can be ensured even if the touch panel 17 is improperly opened. Accordingly, according to the information processing apparatus 11, it is possible to prevent deterioration in security even in a case where opening of the touch panel 17 is contrived.

FIG. 12 is an enlarged view of a main part when the touch panel 17 in FIG. 11 is opened.

In the first flexible substrate 69, the length of the bent portion 79 (the length of the circumference of the bent portion 79) is set to the minimum required. In the first flexible substrate 69, the engagement hole 75 is locked to the rib 89 at a position immediately after the first flexible substrate 69 is folded back at the bent portion 79. Therefore, the back short side of the touch panel 17 can swing at a predetermined angle θ (for example, 0 is less than 30°) with the bent portion 79 disposed at the front short side as a swing center (the distance H between the back short side of the touch panel 17 and the panel arrangement surface 37 is increased to about 50 mm at the maximum), but unauthorized access to the lower layer side of the holder member 61 covering the electronic component 73 is impossible.

In this case, unauthorized access to the lower layer side of the holder member 61 is impossible even if the back short side of the touch panel 17 is opened to some extent. Therefore, in the information processing apparatus 11, it is possible to omit the installation of the opening detection switch 85 that is commonly provided between the back short side of the touch panel 17 and the housing 39. Accordingly, in the information processing apparatus 11, a width L1 (see FIG. 9) of the edge 55 at the back short side of the touch panel 17 can be smaller than a width L2 (see FIG. 9) of the edge 55 at the front short side of the touch panel 17. A length L of a long side of the touch panel 17 is equal to D+L1+L2 in which D represents a length of a long side of the liquid crystal display 65. As a result, the information processing apparatus 11 can be reduced in size in the front-back direction (by L2−L1) as compared with a common structure in which the opening detection switch 85 is provided at the back short side.

The information processing apparatus 11 may include a flat display device (liquid crystal display 65) disposed on the backside of the touch panel 17 on the holder member 61 side, and the second flexible substrate 71 connected to the flat display device. The second flexible substrate 71 may be bent along the first flexible substrate 69 on an inner side of the bent portion 79 of the first flexible substrate 69 and disposed between the holder member 61 and the first flexible substrate 69.

In addition, since the degree of opening of the back short side is restricted, for example, it is difficult for a malicious third party to add resin for disabling the opening detection switch 85. Therefore, the security of the information processing apparatus 11 can be improved.

In the information processing apparatus 11, the touch panel 17 and the flat display device (for example, the liquid crystal display 65) are stack on each other to form the input display module 67. The touch panel 17 is on an outer side of the information processing apparatus 11. The touch panel 17 is larger than the flat display device, and the edges 55 of the touch panel 17 protrudes outward from the contour of the flat display device when viewed from the housing 39 side.

The panel attachment open space 53 in which the input display module 67 is placed is formed in the panel arrangement surface 37 of the housing 39. A stepped portion 57 on which an edge 55 of the touch panel 17 is placed is formed on an inner periphery of the panel attachment open space 53. That is, the input display module 67 is installed on the panel arrangement surface 37 such that the edges 55 of the touch panel 17 are placed on the stepped portion 57, and the flat display device is inserted into the panel attachment open space 53.

The second flexible substrate 71 after being bent on the inner side of the bent portion 79 of the first flexible substrate 69 is disposed between the holder member 61 and the first flexible substrate 69 in the housing 39. However, the extending portion 77 extending from the second flexible substrate 71 is also bent and disposed between the first flexible substrate 69 and the substrate 59.

In the information processing apparatus 11, the lengths of the bent portions 79 of the first flexible substrate 69 and the second flexible substrate 71 are set to the minimum required. In the first flexible substrate 69 and the second flexible substrate 71, the engagement hole 75 is locked to the rib 89 at a position immediately after the first flexible substrate 69 and the second flexible substrate 71 are folded back at the bent portions 79. Therefore, in the touch panel 17, the back short side and the panel arrangement surface 37 can be opened by a predetermined gap (for example, 50 mm at the maximum) with the bent portion 79 disposed at the front short side as a swing center.

At this time, the second flexible substrate 71 is bent along the first flexible substrate 69 on the inner side of the bent portion 79 of the first flexible substrate 69. Therefore, even when the back short side of the touch panel 17 and the panel arrangement surface 37 are opened with a predetermined gap, the first flexible substrate 69 is covered with the second flexible substrate 71 at the bent portions 79 of the first flexible substrate 69 and the second flexible substrate 71. Therefore, the first flexible substrate 69 cannot be visually recognized from the gap on the back short side of the touch panel 17.

Accordingly, since the first flexible substrate 69 is hidden behind the second flexible substrate 71 when viewed from the position where the touch panel 17 is opened, a third party who has opened the touch panel 17 is less likely to notice the presence of the first flexible substrate 69. Therefore, according to the information processing apparatus 11, it possible to prevent the third party from pulling out the first flexible substrate 69 and taking away the electronic component 73.

In addition, in the structure in which the first flexible substrate 69 and the second flexible substrate 71 are stacked, the ribs 89 can penetrate and engage with both the flexible substrates. In this case, according to the information processing apparatus 11, it is possible to increase the strength against tensile fracture of the flexible substrate when a large external force is applied. As a result, according to the information processing apparatus 11, it can be more difficult to pull out the first flexible substrate 69, the second flexible substrate 71, and the electronic component 73.

In the information processing apparatus 11, the touch panel 17 may be formed in a quadrangular shape, and the opening detection switch 85 and the bent portions 79 may be disposed between one side (for example, the front short side or the front edge 55) of the touch panel 17 and the housing 39.

In the information processing apparatus 11, the lengths of the bent portions 79 of the first flexible substrate 69 and the second flexible substrate 71 are set to the minimum required, as described above. In the first flexible substrate 69 and the second flexible substrate 71, the engagement hole 75 is locked to the rib 89 at a position immediately after the first flexible substrate 69 and the second flexible substrate 71 are folded back at the bent portions 79. Therefore, in the touch panel 17, the back short side and the panel arrangement surface 37 can be opened to some extent with the bent portion 79 disposed at the front short side as a swing center.

On the other hand, when the back short side is only opened to some extent, an illegal act of taking away the electronic component 73 is not taken. In this case, if the first flexible substrate 69, the second flexible substrate 71, and the ribs 89 are broken and the touch panel 17 is peeled off, the opening detection switch 85 in contact with the edge 55 of the touch panel 17 is operated in the vicinity of the bent portions 79 of the first flexible substrate 69 and the second flexible substrate 71, and leakage of information can be prevented.

Therefore, in the information processing apparatus 11, it is possible to omit the installation of the opening detection switch 85 that is commonly provided between the back short side of the touch panel 17 and the housing 39. That is, in the information processing apparatus 11, it is only necessary to provide the opening detection switch 85 on the edge 55 of the touch panel 17 in a vicinity of the bent portions 79. Therefore, as described above, the width L1 of the edge 55 at the back short side of the touch panel 17 can be smaller than the width L2 of the edge 55 at the front short side of the touch panel 17 in the information processing apparatus 11. As a result, it is possible to realize miniaturization compared with the structure according to the related art.

In addition, in the information processing apparatus 11, since the bent portions 79 and the like are present in the part from which the first flexible substrate 69 and the second flexible substrate 71 are led out, a certain amount of space is present around the bent portions 79. By effectively using the surplus space, the opening detection switch 85 can be installed without ensuring a new dedicated space for the opening detection switch 85.

In the information processing apparatus 11, the holder member 61 may have through holes 83 through which the first flexible substrate 69 and the second flexible substrate 71 disposed on the inner side of the housing 39 relative to the bent portion 79 pass.

In the information processing apparatus 11, parts of the first flexible substrate 69 and the second flexible substrate 71 immediately after being folded back at the bent portion 79 between the bent portion 79 and the engagement hole 75 pass through the through holes 83. Each of the first flexible substrate 69 and the second flexible substrate 71 is formed in a band shape in which a plurality of parallel conductors are covered with an insulating material. The first flexible substrate 69 and the second flexible substrate 71 are bent in an overlapping state. The electronic component 73 is mounted on a part of the first flexible substrate 69 on a side opposite to the through hole 83 with the engagement holes 75 interposed therebetween (that is, a part substantially parallel to the holder member 61).

In an arrangement structure of such a flexible substrate, even if the first flexible substrate 69 connected to the touch panel 17 and the second flexible substrate 71 are pulled out by a large tensile force and the ribs 89 are broken by a shear force, the first flexible substrate 69 and the second flexible substrate 71 that are pulled out do not deform, at the position of the through hole 83, to a curvature at which the electronic component 73 can pass. As a result, when the first flexible substrate 69 and the second flexible substrate 71 are forcibly pulled out, the electronic component 73 is dropped or broken before passing through the through hole 83. Therefore, in the information processing apparatus 11, the electronic component 73 cannot be taken away, and security can be ensured, even if the touch panel 17 is improperly opened. This also enables the information processing apparatus 11 to prevent deterioration in security even in a case where opening of the touch panel 17 is contrived.

In the information processing apparatus 11, the electronic component 73 may store information input through the touch panel 17.

In the information processing apparatus 11, for example, the electronic component 73 acquires an input to the touch panel 17 as an analog signal, converts the analog signal into touch operation information, and stores the information. In the information processing apparatus 11, the analog signal, which is the initial input information, is likely to be attacked. The electronic component 73 may perform various types of processing based on information input by a touch operation, and may store information of a processing result. According to the information processing apparatus 11, for example, even when a personal identification number is input via the touch panel 17 and the personal identification number is stored in the electronic component 73, the electronic component 73 that stores the personal identification number can be prevented from being taken away, and the reliability of the information processing apparatus 11 can be improved.

Therefore, according to the information processing apparatus 11 of the present embodiment, it is possible to reduce the size of the entire apparatus while preventing deterioration in security even in a case where opening of the touch panel 17 is contrived.

The invention claimed is:

1. An information processing apparatus comprising:
    a housing;
    a touch panel installed in the housing;
    an opening detection switch configured to detect opening of the touch panel from the housing;
    a first flexible substrate connected to the touch panel, bent at a bent portion, provided with an electronic component mounted thereon in the housing, and disposed along the touch panel;
    a holder member installed in the housing between the touch panel and the first flexible substrate;
    a flat display device disposed on a backside of the touch panel on a holder member side; and
    a second flexible substrate connected to the flat display device,
    wherein the holder member comprises a rib protruding toward the first flexible substrate,
    wherein the first flexible substrate has an engagement hole through which the rib penetrates,
    wherein the second flexible substrate is bent along the first flexible substrate on an inner side of the bent portion of the first flexible substrate, and is disposed between the holder member and the first flexible substrate, and wherein the holder member has a through hole through which the first flexible substrate and the second flexible substrate pass, the first flexible substrate and the second flexible substrate being disposed on an inner side of the housing relative to the bent portion.

2. The information processing apparatus according to claim 1, wherein the touch panel is formed in a quadrangular shape, and wherein the opening detection switch and the bent portion are disposed between one side of the touch panel and the housing.

3. The information processing apparatus according to claim 1, wherein the electronic component stores information input through the touch panel.

* * * * *